United States Patent
Higgins et al.

(10) Patent No.: US 7,406,525 B2
(45) Date of Patent: Jul. 29, 2008

(54) CONTENT PROVIDER AND METHOD FOR A COMPUTER SYSTEM

(75) Inventors: Geoff Higgins, Dundrum (IE); Michael Krivoruchko, Stillorgan (IE); Michael Hayes, Lucan (IE)

(73) Assignee: Sun Microsystems, Inc., Palo Alto, CA (US)

( * ) Notice: Subject to any disclaimer, the term of this patent is extended or adjusted under 35 U.S.C. 154(b) by 780 days.

(21) Appl. No.: 10/079,222

(22) Filed: Feb. 19, 2002

(65) Prior Publication Data

US 2002/0116505 A1 Aug. 22, 2002

(30) Foreign Application Priority Data

Feb. 19, 2001 (EP) ................................. 01301422

(51) Int. Cl.
*G06F 15/16* (2006.01)
(52) U.S. Cl. .................. 709/227; 709/223; 379/207
(58) Field of Classification Search ................. 395/610; 379/207; 709/227, 223
See application file for complete search history.

(56) References Cited

U.S. PATENT DOCUMENTS

| | | | |
|---|---|---|---|
| 5,583,927 A | * | 12/1996 | Ely et al. ............... 379/221.09 |
| 5,696,965 A | * | 12/1997 | Dedrick ........................ 707/10 |
| 5,812,768 A | | 9/1998 | Ejtemai-Jandaghi et al. ..... 395/200.09 |
| 5,907,678 A | | 5/1999 | Housel, III et al. ...... 395/200.43 |
| 6,064,977 A | | 5/2000 | Estrada et al. .................. 705/9 |

FOREIGN PATENT DOCUMENTS

| | | |
|---|---|---|
| WO | WO 97 40611 A1 | 10/1997 |
| WO | WO 99 18716 A1 | 4/1999 |
| WO | WO 00 20962 A2 | 4/2000 |

OTHER PUBLICATIONS

Frank Dawson, "Emerging Calendering and Scheduling Standards", Computer, Dec. 1997, USA, vol. 30, No. 12, pp. 126-128, XP002181003.

* cited by examiner

*Primary Examiner*—Jason Cardone
*Assistant Examiner*—Adnan M. Mirza
(74) *Attorney, Agent, or Firm*—Gunnison, McKay & Hodgson, L.L.P.; Forrest Gunnison

(57) ABSTRACT

A content provider interfaces a client with a server. The content provider includes a task manager operable to initiate and manage a session for a client and to query the server, when required, for content requested by the client. The content provider also includes session content storage for storing content associated with that session. The content provider further includes a protocol adapter operable to respond to the task manager for interfacing with the server to retrieve content requested by the client. The retrieved content is stored in the session content storage associated with the session for the client.

23 Claims, 4 Drawing Sheets

CONTENT PROVIDER AND METHOD FOR A COMPUTER SYSTEM

BACKGROUND OF THE INVENTION

1. Field of the Invention

The present invention relates generally to client-server systems, and more particularly to improving access to information, or content, in response to queries from a client application in a client-server computer system.

2. Description of Related Art

Client-server systems are used in accessing calendar and schedule information stored on a calendar server. A calendar server is a server that can provide calendaring and scheduling services to users in a network environment. The use of calendar servers has been limited by the methods used to access the information on such servers.

SUMMARY OF THE INVENTION

In one embodiment of the present invention, a content provider is operable to interface a client with a server. The content provider includes a content provider manager that in turn includes a task manager operable to initiate and manage at least one session for the client and to query the server, when required, for content requested by the client.

The content provider also includes session content storage for storing content associated with a session. The content provider further includes a protocol adapter, operable to respond to the task manager, for interfacing with the server to retrieve content requested by the client. The retrieved content is stored in the session content storage associated with the session for the client.

Hence, this embodiment of the invention facilitates the access of information services through use of an interface between a server providing the services to be accessed and a client. The client may be a client application, for example a web browser or an office application that is implemented in a client device in the form of a computer station. Alternatively, the client may be an application implemented on a device, for example a mobile telephone, personal data access device, etc, that is connectable to a computer network. The client applications are typically such that the applications provide a user interface through which access to information can be requested.

One embodiment of the content provider is implemented in the client device. Alternatively, another embodiment of the content provider is implemented on a server through which the client device makes access to a network. As a further option, the content provider could be implemented as an interface between a network and a server in which information to be accessed is held.

An embodiment of the content provider includes a protocol adapter operable to convert between an internal data format of the content provider and a server data format. The content provider can include a plurality of protocol adapters, each protocol adapter being operable to convert between the internal data format and a respective server data format. Hence, the content provider converts between an internal data format and a selectable one of a plurality of server data formats as represented by said plurality of protocol adapters.

In a particular embodiment of the invention, the server is a calendar server and the server data format is a calendar format. The internal format is based on a markup language.

The task manager is operable to allocate a root in the session content storage for a client session.

The content provider, in one embodiment, includes a task queue and a task processor. The task processor is operable to manage a queue of tasks. The task manager is responsive to a query from the client for content by accessing any pre-existing session storage for the client to retrieve the content if already stored therein, and to query the server otherwise. The task manager is further operable to allocate a location in the session storage as a root for data associated with the session.

In yet another embodiment, the content provider includes:
  content provider manager means for initiating and managing a session for the client and for querying the server, when required, for content requested by the client;
  session content storage means for storing content associated with said session; and
  protocol adapter means for responding to the content provider manager means, and for interfacing with the server to retrieve content requested by the client, the retrieved content being stored in the session content storage associated with the session for the client.

Another aspect of the invention provides a computer program comprising computer code operable to form a content provider for interfacing a client with a server. The computer code is operable to provide a task manager operable to initiate and manage a session for a client and to query the server, when required, for content requested by the client. The computer code also is operable to provide session content storage for storing content associated with that session. The computer code is further operable to provide a protocol adapter component operable to respond to the task manager for interfacing with the server to retrieve content requested by the client. The retrieved content is stored in the session content storage associated with the session for the client.

A computer program product can be provided that comprises the computer program with the computer code being carried by a carrier medium. The carrier medium can be a storage medium or a transmission medium, for example.

One embodiment of the present invention also provides a computer system comprising a processor, memory and a content provider as set out above.

Another embodiment of the invention further provides a method of providing content for a client by interfacing a client with a server, the method comprising:
  initiating and managing a session for a client and querying the server, when required, for content requested by the client by a content provider;
  storing content associated with that session by said content provider; and
  interfacing with the server to retrieve content requested by the client, the retrieved content being stored in the session content storage associated with the session for the client by said content provider

BRIEF DESCRIPTION OF THE DRAWINGS

In the Figures and the following Detailed Description, elements with the same reference numeral are the same or

DETAILED DESCRIPTION

In one embodiment of the present invention, a content provider system, e.g., content provider systems 174A and 174B (FIG. 1), is used to off-load work from a server system 180, and to provide access to information services 190 on server system 180 to different types of devices without making any modifications to data or applications running on server system 180. In one embodiment, the information services are calendar and schedule information from a calendar server.

Figure 1:
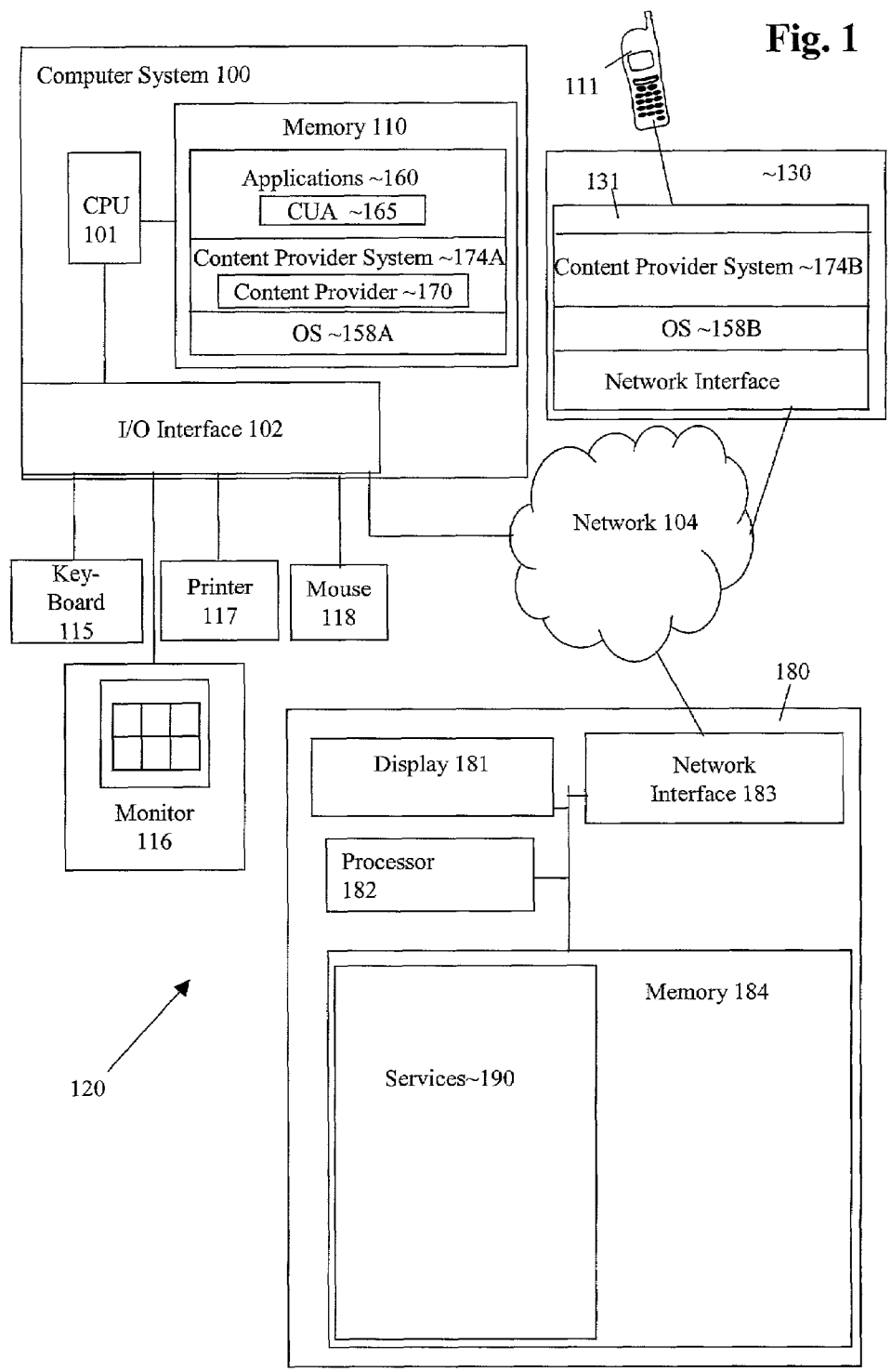
FIG. 1 is a schematic overview of a network environment in which an embodiment of content provider system of the present invention is implemented.

FIG. 1 is an overview of a network environment 120 that includes a plurality of devices 100 and 111 that function as client devices and a server system 180. A client application in applications 160, sometimes called the client, executing on client device 100 utilizes a content provider system 174A for dynamic access via a network 104 to a server system 180 that, in one embodiment, is a calendar server system. Hence, content provider system 174A interfaces a client application with a server system.

In one embodiment, as explained more completely below, content provider system 174A includes a content provider 170 that in turn includes a task manager that initiates and manages at least one session for the client, and that queries server system 180, when required, for content requested by the client. Content provider 170 also includes session content storage for storing content associated with the session. Hence, repeated accesses to server system 180 for the content are unnecessary since the content can be accessed in the session content storage. In one embodiment, content provider system 174A further includes a protocol adapter that functions as an interface between the task manager and server system 180.

Network 104 can be a local area network, a wide area network, an intranet, the Internet, any other form of network, or any combination of the above. The client application is not limited to an application on a computer system such as computer system 100 that can be a personal computer, a workstation, or a portable computer for example. Thus, the client could be a client application in the form of functionality in a personal data access device, a personal digital assistant, a mobile telephone, or a telephone.

FIG. 1 also illustrates an example of a mobile telephone 111 that is connected via a wireless link to a station 130. Station 130 includes at least one computer 131 and is connected to network 104. Computer 131 includes a content provider system 174B that interfaces the client application on mobile telephone 111 and server system 180.

Typically, the client application on mobile telephone 111, or other mobile device does not include a high degree of functionality and is often termed a "thin client". In contrast, a client application on a device such as system 100 is typically in the form of an office application, or a web browser, or the like and has a higher degree of functionality, and is often termed a "thick client".

In the present embodiment, content provider systems 174A and 174B are implemented at the client side, rather than the server side. For the example of a thin client, such as a web-access mobile telephone 111, content provider system 174B is typically implemented in station 130. However alternatively, content provider system 174B also could be implemented in mobile phone 111, and similarly in a personal data assistant device, etc.

In the following description, an exemplary implementation of a content provider system 174A in a client station in the form of a personal computer 100 is described. The particular configuration of personal computer 100 is not essential to this invention. In this embodiment, personal computer 100 includes a microprocessor 101 and a main memory 110 interconnected via a bus. I/O interface 102 includes a first network interface that enables connection to external network 104. Optionally, a further network interface (not shown) can enable connection to another network. A display adapter in I/O interface 102 supports a display device 116. An input adapter in I/O interface 102 is connected to input devices such as a keyboard 115 and a mouse 118. One or more media drive interfaces (not shown) enable connection of various media drives the internal bus.

As illustrated in FIG. 1, main memory 110 of personal computer 100 includes content provider system 174A that in turn includes one embodiment of content provider 170. Main memory 110 also includes operating system 158A and various client applications 160. Client applications 160 include a calendar user application 165. Herein, main memory 110 may include any desired combination of volatile memory and non-volatile memory.

Figure 2:
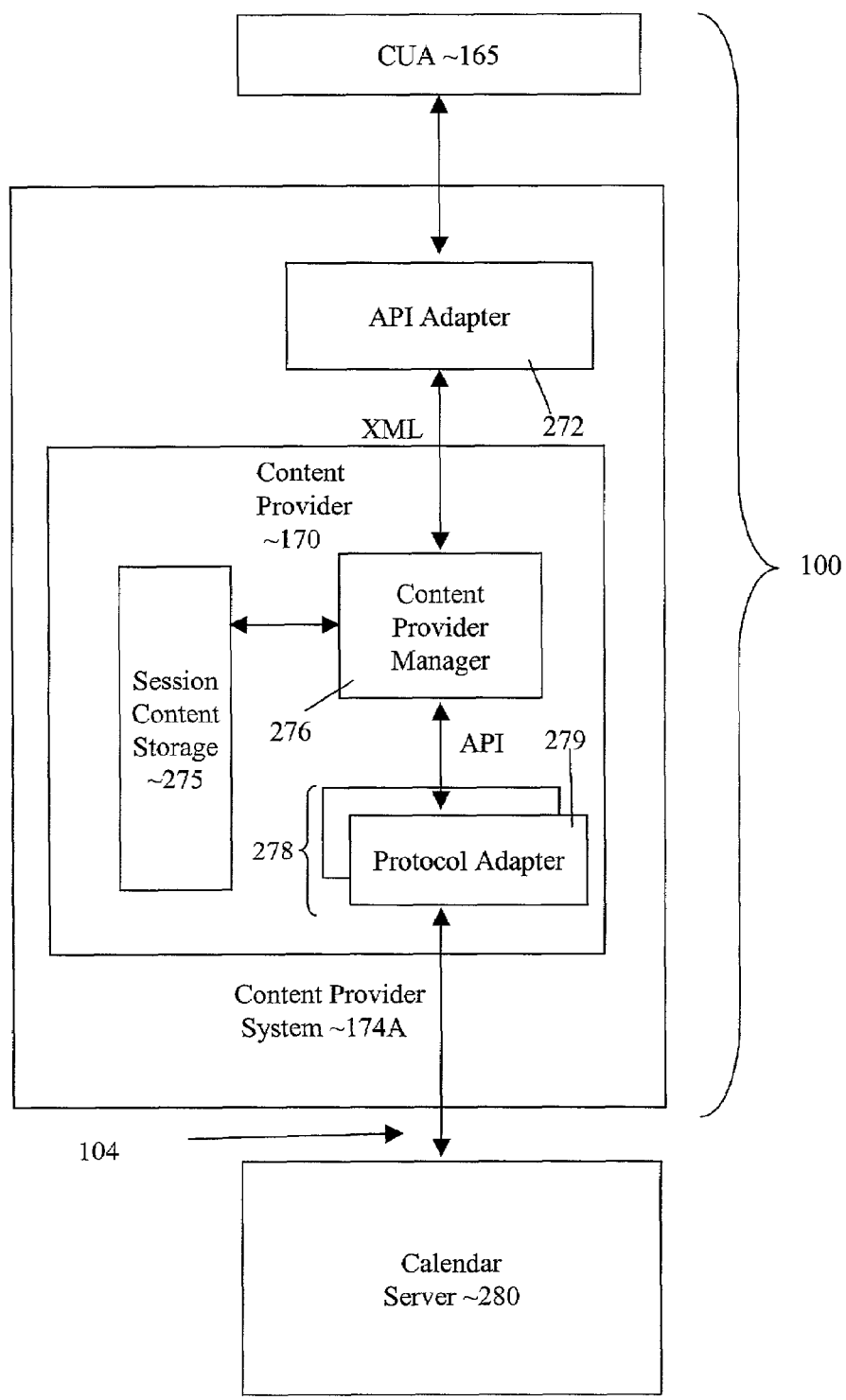
FIG. 2 is a schematic overview of software components for an example of the invention where a content provider is implemented in a client computer.

FIG. 2 gives an overview of an embodiment of content provider system 174A of the present invention. Content provider system 174A includes a content provider 170 and an application program interface (API) adapter 272. In this embodiment, content provider 170 is sub-divided into a content provider manager 276 and one or more protocol adapters 278.

In general terms, content provider 170 accepts calendaring and scheduling requests originating at calendar user application 165. Content provider 170 converts the format of a request received from calendar user application 165 to a target server specific format request, e.g., a format applicable for calendar server 280.

Content provider 170 delivers the target server specific format request to target server 280. In response to the request, content provider 170 receives a target server specific format response from target server 280. Content provider 170 converts data returned from target server 280 to an internal binary format suitable for internal needs and suitable for presentation to calendar user application 165. Content provider 170 also monitors server calendar data on target server 280 to enable client notification in the event of relevant changes to the server calendar data.

API adapter 272 maps requests from calendar user application 165 to requests for content provider manager 276. While a single API adapter 272 is shown in FIG. 2. This is illustrative only and is not intended to limit the invention to this specific embodiment. In another embodiment, API adapter 272 represents a plurality of API adapters.

In content provider system 174A, API adapter 272 is separate from content provider 170 to provide flexibility for future developments. For example, future API adapters could provide a different interaction with calendar user application 165 according to future requirements.

In the present exemplary implementation, communication with content provider 170 is via extensible Mark-up Language (XML) requests so that XML-aware clients could, if desired, bypass API adapter 272 and send requests directly to content provider 170. More details of XML can be found in any one of the numerous widely available textbooks on the subject and from the website of the World Wide Web Consortium at http://www.w3.org.

In one embodiment, API adapter 272 is, for example, consistent with the so-called Universal Content Broker (UCB)

framework that is embodied in the STAROFFIFCE product range, as provided by Sun Microsystems, Inc. (STAROFFICE is a trademark of Sun Microsystems, Inc., Palo Alto, Calif.)

One of the basic operations of content provider 170 is to establish storage for the assembly of the content information required to service a request from calendar user application 165. In one embodiment, content provider manager 276 allocates a root address in session content storage 275 for a client session. Hence, storage for the client session is associated with a root address, hereinafter root. As explained more completely below, content that is retrieved in response to a query in the client session is stored in a hierarchical relation to the root. Consequently, for each content query, content provider manager 276 accesses any pre-existing session storage to retrieve the content if already stored therein, and to transmit the query to calendar server 280 otherwise.

More specifically, a request from calendar user application 165 requests creation of a root by content provider manager 276. Content provider manager 276, in the example of FIG. 3 creates a root 390 and root 390 is then used by API adapter 272. Content at root 390 is created by content provider manager 276 in response to a specific request, e.g., a query, from calendar user application 165 accompanied by a relevant Uniform Resource Identifier (URI) for the root content. The root content may be viewed as approximately equivalent to an authenticated session with the relevant calendar server.

Figure 3:
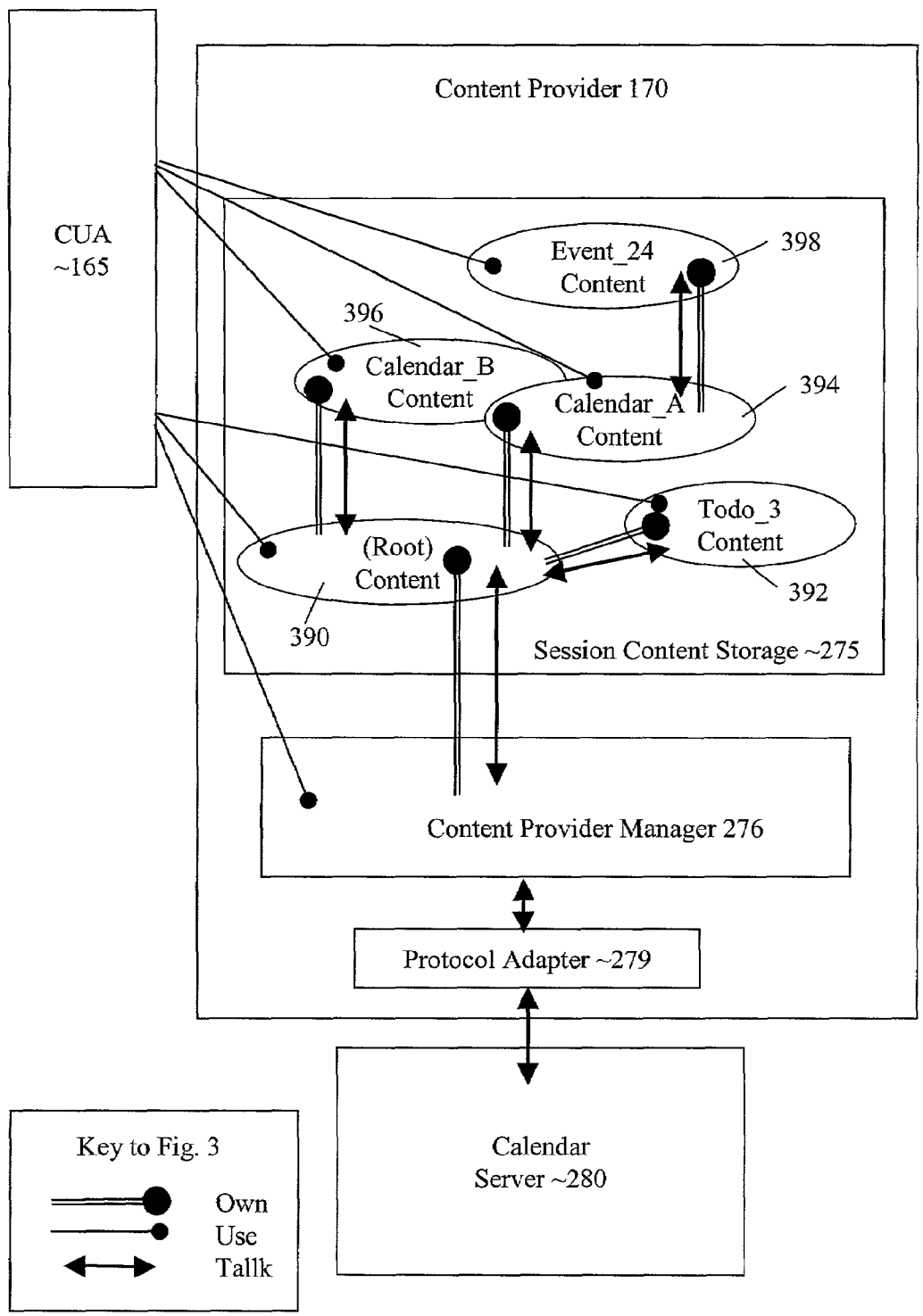
FIG. 3 is a schematic representation of the provision of information using an embodiment of the present invention.

FIG. 3 illustrates various contents associated with root 390 for particular requests, e.g., queries, from calendar user application 165. The root content at root 390 owns Todo_3 content 392, calendar_A content 394, and calendar_B content 396. Calendar_A content owns Event_24 content 398.

Once a calendar user application 165 has obtained a root 390 and a content reference for root 390, application 165 is free to retrieve sub-content, e.g., calendars 394 and 396, access the actual data represented as content, insert new content, execute commands which operate on the content, etc. These operations can be provided using appropriate content interfaces. This is illustrated in FIG. 3 as application 165 using content 390 to 398.

As represented in FIG. 3, the various instances of content generated form a hierarchy. Thus, a root calendar contains sub-calendars that contain calendar components, which in turn contain calendar component properties.

Figure 4:
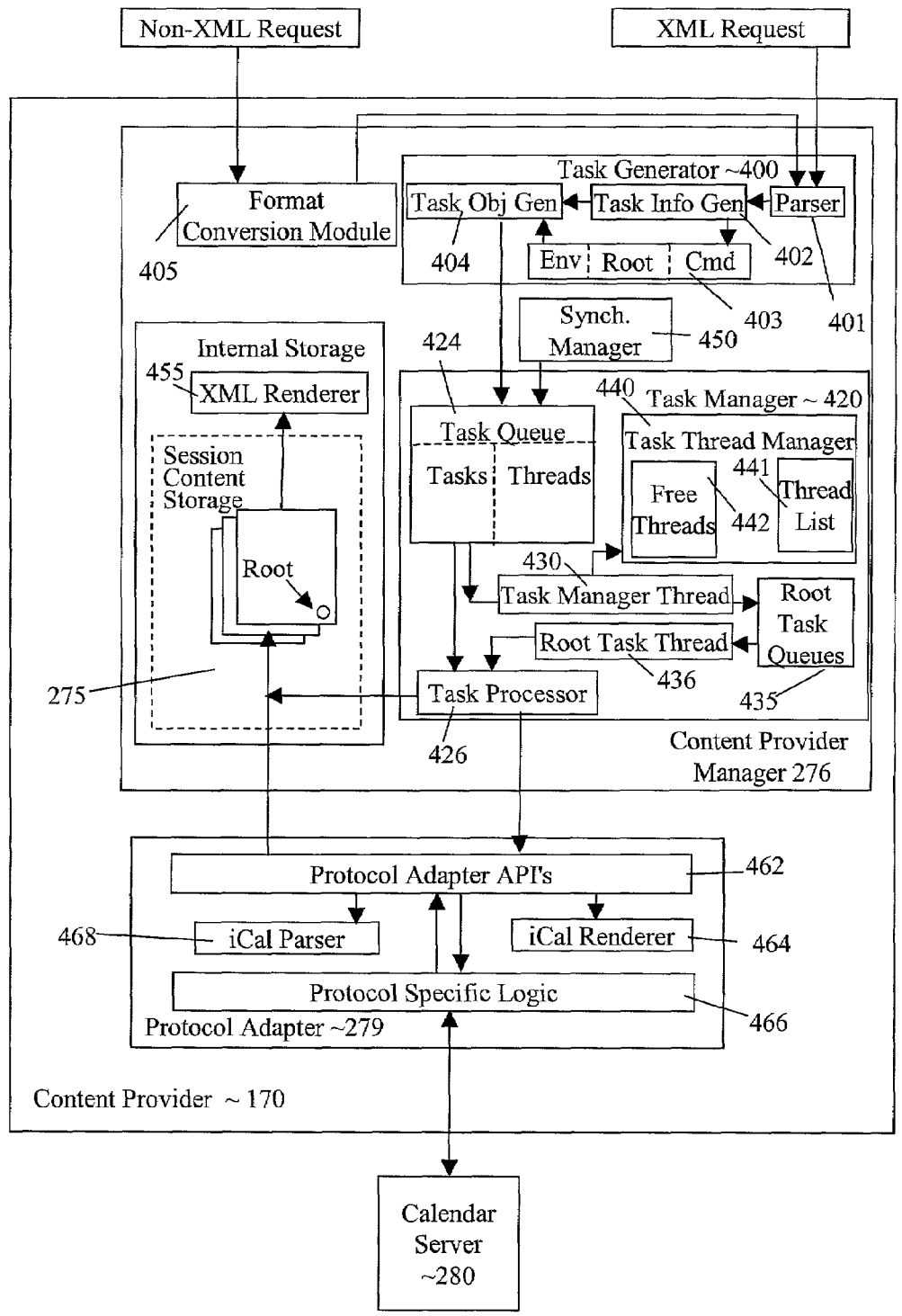
FIG. 4 is a schematic representation in more detail of an embodiment of the present invention.

FIG. 4 illustrates one embodiment of content provider 170 in more detail. Content provider 170 is responsible for the generation of content on receipt of a content identifier, effectively a URI, from calendar user application 165. Three possible scenarios are described relating to how calendar user application 165 can use content provider 170 depending on the type of information referenced by the supplied content identifier.

A first scenario is that a content identifier referencing target calendar server 280 is supplied by calendar user application 165. In this case, a non-authenticated session is generated with target calendar server 280. A root content representing the session is generated in session content storage 275.

A second scenario is that a content identifier references target calendar server 280 and authentication information is supplied by calendar user application 165. In this case, an authenticated session is generated with target calendar server 280. A root content representing the session is generated. This root content provides the API adapter functionality described above.

Optionally, a third scenario could be envisaged where a content identifier references an authenticated session and a particular piece of data, e.g., an event, in a calendar store is provided by calendar user application 165. In this case the required data would be requested from server 280 and would eventually be represented as content, not in the content hierarchy described above, but directly linked to the relevant root content.

Typically, a request is received at task generator 400 in XML format. However, if the request is not in XML format, the request is received by format conversion module 405. Format conversion module 405 converts the request to a XML request, which is then sent to task generator 400.

Task generator 400 issues tasks to task manager 420. Task manager 420 includes a task queue 424 in which a queue of tasks, which are waiting execution, is held. A task processor 426 forming part of task manager 420 draws tasks from task queue 424. Depending on the nature of the task, task processor 426 either makes a server request to a calendar service on calendar server 280 via protocol adapter 279 or retrieves data directly from session content storage 275, as described below. Herein, when it is said that a processor takes an action, or similar expression, those of skill in the art understand that the processor executes one or more instructions that result in the action.

If a server request is necessary, (for inserting a new event) the task is forwarded to the protocol adapter module 279 for delivery to calendar server 280. Otherwise, for example where the request is for the value of a calendar component property, task processor 426 retrieves the relevant data from session content storage 275 and returns that data.

Some calendar servers provide mechanisms for informing calendar clients of third party changes to calendar store data. Other calendar servers do not provide this information. Synchronization manager 450 is therefore responsible for ensuring that any calendar data stored internally remains up to date. An example of this is where calendar user application 165 creates content representing a user's calendar. Calendar user application 165 may choose to add a content event listener for content events on this calendar such as insert, delete, modify, etc. Synchronization manager 450 is operable to insert appropriate tasks in task queue 424 to ensure that task processor 426 sends appropriate queries to calendar server 280 at regular intervals to check for any such content events.

The default internal format used for representing calendar data within content provider manager 276 is an XML format modeled on the iCalendar format. The iCalendar internet calendaring and scheduling core object specification is set out in RFC 2445, details of which can be located via the website of the Internet Engineering Task Force http://www.ietf.org. The current default application and transport protocol for server communications is the Calendar Access Protocol (CAP), the details of which can also be located at the website of the Internet Engineering Task Force http://www.ietf.org.

Ideally, all calendar services to which content provider manager 276 connects implement both of these protocols and then CAP requests are sent from a basic protocol module. However, this is not the case. Accordingly, therefore, protocol adapter 279 is used to provide an interface between the internal protocol used within content provider manager 276 and calendar server 280.

Protocol adapter module 279 includes protocol adapter APIs 462. Protocol adapter APIs 462 provide interfaces for use by task processor 426 as well as protocol functionality common to calendar servers from the calendar service providers. A renderer 464 is used to render data in the internal binary format used within content provider module 276 to the iCalendar format. Protocol specific logic 466 provides the calendar service provider specific protocol functionality required to interact with calendar servers from the calendar service providers providing calendar server 280.

iCalendar parser 468 is used to convert iCalendar data returned from server 280 to the internal binary format used within content provider manager 276. Accordingly, protocol adapter 279 provides an interface between the internal format used by content provider manager 276, and the external format used by connected calendar server 280.

Session content storage 275 supports multiple sessions with the hierarchical storage of session data as described with reference to FIG. 3. Data returned from calendar server 280 via protocol adapter 279 is stored in session content storage 275. Ideally, only a single copy of any shared server data, e.g., an event such as event_24 content 398, requested by two different sessions, would be stored in session content storage 275. However as it may not be certain which session is allowed to have access to that data, in practice, a copy of the data is stored for each session requiring access to that server data. A session is defined as activity relating to a root defined for a calendar user application request.

The data within session content storage 275 is stored using the hierarchical structure described with reference to FIG. 3. In addition, data can be stored for internal use only in session content storage 275. XML renderer 455 enables rendering of data in session content storage 275 into XML format for return to calendar user application 165.

In the embodiment of FIG. 4, a task is created from a parsed request. Herein, a request is sometimes referred to as a command. A task is associated with a session and exists within storage defined for that session.

A request is parsed by a parser 401 in task generator 400. In one embodiment, task generator 400 is implemented by execution of a create task module.

Upon completion of the parsing by parser 401, task information generator 402 generates a task information object 403 using data from the parsed request. In one embodiment, task information generator 402 is implemented by execution of a task information module called CSATaskInfo.

Task information object 403 maintains details of the environment ENV in which the content for a command was parsed, of the root node Root that has been found or created, and the binary representation of the parsed command Cmd. In the present implementation, the binary representation of the parsed command is a Document Object Model (DOM) node. More details of DOM can be found in most of the numerous widely available textbooks on XML and from the website of the World Wide Web Consortium at http://www.w3.org. Once the command has been parsed, all members described in task information object 403 hold all values necessary to create a task object.

A command task object, sometimes called a command task, is allocated by task object generator 404. In one embodiment, task object generator 404 is implemented via a call to a create new task method. Task object generator 404 calls a reference to task information object 403 when passing the command task. Once created, the command task is placed in task queue 424 of task manager 420. When the command task has been created, the command task is equipped with a protocol specific execution scheme by task processor 426, as described below, so that the command task can be executed by server 280.

In this embodiment, task queue 424 is implemented as a first-in-first-out (FIFO) queue. However, in other embodiments, loading balancing, fairness protocols, or other management techniques could be used in managing the flow of command tasks thru task queue 424.

Task queue 424 provides standard queue functionality and is controlled by a mutex to allow queue 424 to be locked when items are being added to and removed from queue 424. Queue 424 is locked by task processor 426 when placing a command task in queue 424, and is locked by a task manager thread 430 when objects are taken from the queue and are placed in a root task queue in root task queues 435.

Task processor 426 employs strategies to determine how command tasks are executed. Strategies are protocol (and task) specific classes that control how the command tasks are executed.

Task processor 426 requests a strategy from protocol adapter 279. Protocol adapter 279 examines the command represented by the command task and returns an appropriate execution strategy based on the current protocol. The command task is now ready to be executed.

At the point of command task execution, a task manager thread 430 is blocked waiting for items on task queue 424. When task processor 426 places an item on task queue 424, task manager thread 430 resumes. Task manager thread 430 returns to the blocked state if task queue 424 is empty. (In FIG. 4, threads are shown as separate elements. However, this is for clarifying the functions of the various threads. Those of skill in the art understand that when it is stated that a thread takes some action, the thread is executing on task processor 426.)

Task queue 424, in this embodiment, also maintains account of the thread serving queue 424 as well as providing standard queue functionality. In one implementation, there is only one thread per root. However, in other implementations, more than one thread may be assigned to any one root for servicing tasks.

Task manager thread 430 is responsible for taking items from task queue 424 and passing the items to a root task queue of the root object in root task queues 435. When adding a task to the root task queue, task manager thread 430 always checks to see if there is a thread serving that root queue. For convenience, such a thread is referred to as a root task thread. If there is not a root task thread serving that root queue, task manager thread 430 obtains a thread to service the root from task-thread manager 440.

Task-thread manager 440 controls the allocation of threads within task manager 420. Task-thread manager 440 maintains a limited pool of threads. The limit is set to prevent system choking due to too many threads being allocated. Two data structures, threads list 441 and a free threads stack 442, operate within task-thread manager 440. Threads list 441 is a list of all threads owned by task-thread manager 440 independent of whether the threads are in use or free. Free threads stack 442 is a stack that contains only available, i.e., not busy, threads. The aim is to enable efficient re-use of threads that were previously in use as opposed to allocating new threads each time.

When task manager thread 430 calls task-thread manager 440, task-thread manager 440 checks stack 442 to see if any free threads are available. If a free thread is available, the free thread is popped off the stack and returned. Otherwise, a new thread is created, is added to list 441 and returned.

When any thread finishes running, the thread returns itself to free threads stack 442. To do this, each thread is provided with a pointer to stack 442 to which the thread should return. In one embodiment, a task thread constructor is passed a pointer to free threads stack 442 that is used in generating the thread.

When a task thread is assigned a root by task manager thread 430 to become root task thread 436, root task thread 436 takes a task from the root task queue in queues 435 and executes the task using the strategy determined by protocol adapter 279. When the task has completed, root task thread 436 looks back into the root task queue. If there are more tasks in the root task queue, root task thread 436 continues taking them from the root task queue and processing them. If there are no more tasks, root task thread returns itself to free threads stack 442.

A task is assigned to a root by calling its start method and passing the root object that it is to serve. In the following, more details are given for one embodiment of task creation and execution.

To create a new task object, a create new task method is called. The task information class is passed to this method. The task information class has a constructor, "get" methods for accessing protected data members and three data members. The three data member include a command environment member Env (See object 403 in FIG. 4) that allows for feedback on command status, a root member Root, which is the root object that lives within storage 275 (each session has a root, and each task must be associated with a root), and a DOM_Node member Cmd that holds the passed command. As mentioned above, DOM_Node structures are used for the internal binary representation of commands.

Each of the members of task information object 403 are initialized before passing them to the create new task object. In effect, task information object 403 is a package of information that is gathered by passing a command. For this purpose, the command parser is derived from the task information. The derived class is responsible for passing the command. The derived class is passed as a command parameter to the command parser and the command parser stores the results in the member it inherits from the task information object. The members of the task information object are protected so that the command parser has access to all task information object members.

Task objects are created through a call to the create new task object. As mentioned above, the task information object is passed with this call. The create a new task method dynamically creates a new task implementation object and assigns it to the task class member.

There has been described a content provider for providing a unified method of access to information services. The content provider can be implemented by one or more computer programs comprising computer code. A computer program product can be provided comprising computer code on a carrier medium. The carrier medium could be storage medium (such as an optical, a magneto-optical, a magnetic or a solid state storage medium configured as a disk, tape or solid state device, etc), or a transmission medium (such as a telephonic, wireless, copper, optical or other wired medium, etc), or a mixture thereof, as appropriate.

Although particular embodiments of the invention have been described, it will be appreciated that many modifications/additions and/or substitutions may be made within the spirit and scope of the claimed invention.

We claim:

1. A content provider operable to interface a client calendar application with a calendar server, the content provider comprising: a content provider manager operable to initiate and manage a session for the client calendar application and to query the calendar server, when required, for content requested by the client calendar application; session content storage, wherein said session content storage stores content associated with said session including any previously retrieved content from the calendar server associated with said session; and a protocol adapter, operable to respond to the content provider manager, for interfacing with the calendar server to retrieve said content requested by the client calendar application, the retrieved content being stored in the session content storage associated with the session for the client calendar application, wherein the protocol adapter converts at least one query between an internal data format and a server calendar format; the content provider manager is responsive to a request originated by said client calendar application, for content on said calendar server (i) by accessing said any previously retrieved content stored in said session content storage to retrieve the content requested if already stored therein, and (ii) by querying the calendar server for said content requested otherwise; said content provider interfaces said client calendar application with said calendar server; and said content provider provides access to content on said calendar server to different devices executing said client calendar application without making modifications to said content on said calendar server and said content provider off-loads work from said calendar server by utilizing said session content storage.

2. The content provider of claim 1, comprising a plurality of protocol adapters, each protocol adapter for converting at least one query between the internal data format and a respective server data format.

3. The content provider of claim 1, wherein the calendar format is based on the iCalendar format.

4. The content provider of claim 1, wherein the internal data format is based on a markup language.

5. The content provider of claim 1, wherein the content provider manager is operable to allocate a root address in the session content storage for said session.

6. The content provider of claim 1, comprising a task queue and a task processor, the task processor being operable to manage a queue of tasks.

7. The content provider of claim 1, further comprising at least one application program interface for interfacing with said client calendar application.

8. A computer program product comprising a tangible computer program medium having embodied therein executable program code operable to form a content provider for interfacing a client calendar application with a calendar server wherein execution of the program code comprises: a content provider manager operable to initiate and manage a session for the client calendar application and to query the calendar server, when required, for content requested by the client calendar application; session content storage, wherein said session content storage stores content associated with said session including any previously retrieved content from the calendar server associated with said session; and a protocol adapter, operable to respond to the content provider manager, for interfacing with the calendar server to retrieve said content requested by the client calendar application, the retrieved content being stored in the session content storage associated with the session for the client calendar application, wherein the protocol adapter converts at least one query between an internal data format and a server calendar format; the content provider manager is responsive to a request originated by said client calendar application, for content on said calendar server (i) by accessing said any previously retrieved content stored in said session content storage to retrieve the content requested if already stored therein, and (ii) by querying the calendar server for said content requested otherwise; said content provider interfaces said client calendar application with said calendar server; and said content provider provides access to content on said calendar server to different devices executing said client calendar application without making modifications to said content on said calendar server and said content provider off-loads work from said calendar server by utilizing said session content storage.

9. The computer program product of claim 8 comprising a plurality of protocol adapters, each protocol adapter for converting at least one query between the internal data format and a respective server data format.

10. The computer program product of claim 8, wherein the calendar format is based on the iCalendar format.

11. The computer program product of claim 8, wherein the internal data format is based on a markup language.

12. The computer program product of claim 8, wherein the content provider manager is operable to allocate a root address in the session content storage for said session.

13. The computer program product of claim 8, comprising a task queue and a task processor, the task processor being operable to manage a queue of tasks.

14. The computer program product of claim 8, further comprising at least one application program interface for interfacing with said client calendar application.

15. A computer system including a processor, memory and a content provider, the content provider operable to interface a client calendar application with a calendar server, the content provider comprising: a content provider manager operable to initiate and manage a session for the client calendar application and to query the calendar server, when required, for content requested by the client calendar application; session content storage, wherein said session content storage stores content associated with said session including any previously retrieved content from the calendar server associated with said session; and a protocol adapter, operable to respond to the content provider manager, for interfacing with the calendar server to retrieve said content requested by the client calendar application, the retrieved content being stored in the session content storage associated with the session for the client calendar application, wherein the protocol adapter converts at least one query between an internal data format and a server calendar format; the content provider manager is responsive to a request originated by said client calendar application, for content on said calendar server (i) by accessing said any previously retrieved content stored in said session content storage to retrieve the content requested if already stored therein, and (ii) by querying the calendar server for said content requested otherwise; said content provider interfaces said client calendar application with said calendar server; and said content provider provides access to content on said calendar server to different devices executing said client calendar application without making modifications to said content on said calendar server and said content provider off-loads work from said calendar server by utilizing said session content storage.

16. The computer system of claim 15, wherein the computer system is a client system connectable to a network and incorporating said client calendar application that forms a client to be interfaced with said calendar server.

17. A content provider operable to interface a client calendar application with a calendar server, the content provider comprising: a content provider manager means for initiating and managing a session for the client calendar application and for querying the calendar server, when required, for content requested by the client calendar application; session content storage means for storing content associated with said session including any previously retrieved content from the calendar server associated with said session; and a protocol adapter means for responding to the content provider manager means and for interfacing with the calendar server to retrieve said content requested by the client calendar application application, the retrieved content being stored in the session content storage means associated with the session for the client calendar application, wherein the protocol adapter means converts at least one query between an internal data format and a server calendar format; the content provider manager means is responsive to a request originated by said client calendar application, for content on said calendar server (i) by accessing said any previously retrieved content stored in said session content storage means to retrieve the content requested if already stored therein, and (ii) by querying the calendar server for said content requested otherwise; said content provider interfaces said client calendar application with said calendar server; and said content provider provides access to content on said calendar server to different devices executing said client calendar application without making modifications to said content on said calendar server and said content provider off-loads work from said calendar server by utilizing said session content storage means.

18. A method of providing content for a client by interfacing a client calendar application with a calendar server, the method comprising:
 initiating and managing, by a content provider, a session for the client calendar application and querying the calendar server, when required by said content provider, for content requested by the client calendar application;
 storing content associated with that session, by said content provider, including any previously retrieved content from the calendar server associated with said session;
 interfacing, by said content provider, with the calendar server to retrieve said content requested by the client calendar application, the retrieved content being stored in the session content storage associated with the session for the client calendar application by said content provider;
 converting, by said content provider using a protocol adapter, at least one query between an internal data format and a calendar server data format; and
 responding, by said content provider, to said request for content on said server from said client calendar application (i) by accessing said stored content to retrieve the requested content if already stored, and (ii) to query the calendar server for said requested content otherwise wherein said content provider interfaces said client calendar application with said calendar server and further wherein said content provider provides access to content on said calendar server to different devices executing said client calendar application without making modifications to said content on said calendar server and said content provider off-loads work from said calendar server by utilizing said session content storage.

19. The method of claim 18, comprising wherein said converting further comprises converting said least one query between an internal data format and a selectable one of a plurality of calendar server data formats by said content provider.

20. The method of claim 18, wherein the calendar format is based on the iCalendar format.

21. The method of claim 18, wherein the internal data format is based on a markup language.

22. The method of claim 18, comprising allocating a root address in the session content storage for said session.

23. The method of claim 18, comprising managing a queue of tasks.

* * * * *

UNITED STATES PATENT AND TRADEMARK OFFICE
CERTIFICATE OF CORRECTION

| | |
|---|---|
| PATENT NO. | : 7,406,525 B2 |
| APPLICATION NO. | : 10/079222 |
| DATED | : July 29, 2008 |
| INVENTOR(S) | : Geoff Higgins, Michael Krivoruchko and Michael Hayes |

It is certified that error appears in the above-identified patent and that said Letters Patent is hereby corrected as shown below:

In Column 12, Lines 1-2, Claim 17, after "calendar application", delete "application".
In Column 12, Lines 55-56, Claim 19, delete "by said content provider".

Signed and Sealed this

Twenty-first Day of October, 2008

JON W. DUDAS
*Director of the United States Patent and Trademark Office*